(12) United States Patent
Keiner (10) Patent No.: US 12,064,305 B2
(45) Date of Patent: Aug. 20, 2024

(54) SILICONE CASING FOR A VIBRATING TOOTH CLEANING DEVICE, AND METHOD FOR MANUFACTURING SAID SILICONE CASING

(71) Applicant: BLBR GmbH, Grünwald (DE)

(72) Inventor: Michael Keiner, Braunfels (DE)

(73) Assignee: BLBR GmbH, Grünwald (DE)

( * ) Notice: Subject to any disclaimer, the term of this patent is extended or adjusted under 35 U.S.C. 154(b) by 763 days.

(21) Appl. No.: 17/252,924

(22) PCT Filed: Jun. 28, 2019

(86) PCT No.: PCT/EP2019/067434
§ 371 (c)(1),
(2) Date: Dec. 16, 2020

(87) PCT Pub. No.: WO2020/020576
PCT Pub. Date: Jan. 30, 2020

(65) Prior Publication Data
US 2021/0361400 A1   Nov. 25, 2021

(30) Foreign Application Priority Data
Jul. 25, 2018 (EP) ..................................... 18185450

(51) Int. Cl.
*A61C 17/22* (2006.01)
*A61C 17/34* (2006.01)
(Continued)

(52) U.S. Cl.
CPC ............ *A61C 17/228* (2013.01); *A61C 17/34* (2013.01); *B29C 45/0001* (2013.01);
(Continued)

(58) Field of Classification Search
CPC ..... A61C 17/228; A61C 17/222; A61C 17/34; A61C 17/3481; A61C 17/349;
(Continued)

(56) References Cited

U.S. PATENT DOCUMENTS

2009/0276972 A1 * 11/2009 Dugan ................. A61C 17/349
                                                             15/167.2
2013/0014331 A1 *  1/2013 Garner ................. A61C 17/228
                                                             15/22.1
(Continued)

FOREIGN PATENT DOCUMENTS

CN      106725961 A  *  5/2017
DE        10230736 A1 *  1/2004 ......... A61C 17/0211
(Continued)

OTHER PUBLICATIONS

Translation of WO 2013128141 A1 (Year: 2013).*
(Continued)

*Primary Examiner* — Steven M Cernoch
*Assistant Examiner* — Steven Huang
(74) *Attorney, Agent, or Firm* — Dickinson Wright PLLC (57) ABSTRACT

The present invention provides a mouthpiece for a vibratory tooth cleaning device for simultaneously cleaning several, preferably all, of a user's teeth, comprising a holder and a silicone casing substantially completely surrounding the holder. In addition, a vibratory tooth cleaning device and a manufacturing method for a silicone casing and mouthpiece are provided.

14 Claims, 7 Drawing Sheets

(51) Int. Cl.
  *B29C 45/00*   (2006.01)
  *B29C 45/17*   (2006.01)
  *B29K 83/00*   (2006.01)
  *B29L 31/00*   (2006.01)

(52) U.S. Cl.
  CPC .......... *B29C 45/17* (2013.01); *B29K 2083/00* (2013.01); *B29L 2031/712* (2013.01)

(58) Field of Classification Search
  CPC ... A61C 17/0211; A46B 9/045; A46B 13/023; A46D 3/00; A46D 3/005; B29C 45/0001; B29C 45/34; B29K 2083/00; B29L 2031/712; A63B 71/085
  USPC .............................................. 15/188; 300/21
  See application file for complete search history.

(56) References Cited

U.S. PATENT DOCUMENTS

| | | | |
|---|---|---|---|
| 2014/0272761 | A1 | 9/2014 | Lowe et al. |
| 2015/0282911 | A1* | 10/2015 | Steiner ................ A61C 17/228 15/22.2 |
| 2018/0184795 | A1 | 7/2018 | Pai et al. |
| 2019/0000601 | A1* | 1/2019 | Huang ................ A61C 17/224 |
| 2020/0178680 | A1* | 6/2020 | Van Dijk ................ A46B 9/04 |

FOREIGN PATENT DOCUMENTS

| | | | | |
|---|---|---|---|---|
| DE | 102015109891 A1 | 12/2016 | | |
| WO | WO-2013128141 A1 | * | 9/2013 | ............. A46B 9/045 |
| WO | WO-2018160986 A1 | * | 9/2018 | ......... A46B 11/0006 |

OTHER PUBLICATIONS

Nylon—Wikipedia (https://en.wikipedia.org/w/index.php?title=Nylon&oldid=753507995), dated Dec. 7, 2016 (Year: 2016).*
Translation of DE 10230736 A1 (Year: 2004).*
Translation of CN-106725961-A (Year: 2017).*

* cited by examiner

SILICONE CASING FOR A VIBRATING TOOTH CLEANING DEVICE, AND METHOD FOR MANUFACTURING SAID SILICONE CASING

CROSS-REFERENCE TO RELATED APPLICATIONS

This application is a U.S. National Stage of International Application No. PCT/EP2019/067434, filed on Jun. 28, 2019, which claims the benefit and priority of European patent application EP 18 185 450.6 filed on Jul. 25, 2018, the entire contents of which are incorporated herein by reference.

TECHNICAL FIELD

The present invention relates to a silicone casing for a vibratory tooth cleaning device, a manufacturing process for the silicone casing, a mouthpiece with the silicone casing and a vibratory tooth cleaning device with the mouthpiece. In particular, the invention relates to a silicone casing for a vibratory tooth-cleaning device, which enables the simultaneous cleaning of several, preferably all teeth of a user, and a corresponding manufacturing process.

DESCRIPTION OF THE STATE OF THE ART

Cleaning teeth is the basis of individual prophylaxis for tooth preservation. Primary aims are the removal of bacterial plaques (caries, periodontitis), and the removal of food residues and foreign bodies. Secondary aims are fluoride application by means of toothpastes for increasing the resilience of the teeth, particularly the dental enamel, to acidic metabolites of the bacteria in the oral cavity.

The most widespread and also cheapest model is the manually guided short-headed toothbrush. A few regions in the mouth can better be reached by means of a short brush head, which is why high-quality manual toothbrushes often have a short head, medium-hard to soft plastic bristles with rounded bristle ends and an ergonomic handle, which allows reliable guidance.

Another popular way for cleaning teeth is to use an oscillating-rotating toothbrush, which is characterized by a round rotating or oscillating brush head. The functioning principle is similar to a tooth polishing tool. The cleaning performance of oscillating-rotating brush heads is, according to a study, slightly better than that of manual toothbrushes.

The electronic sonic toothbrush is a further development of the electric toothbrush. In said device, the brush head is moved with a higher frequency than in the case of conventional electric toothbrushes, which usually is a frequency of 250 to 300 Hz.

A more recent development is the ultrasonic toothbrush, which works at oscillation frequencies above 300 Hertz. Ultrasonic toothbrushes can operate at up to 1.8 million oscillations per second (1.8 MHz). Devices of this type operate with a swab which excites the liquid in the mouth to oscillate and foam bubbles, created with the aid of a special toothpaste, are caused to burst. It is this bursting of the bubbles that creates the cleaning effect. Ultrasonic toothpaste does not contain any cleaning particles, which means that the cleaning action is no longer mechanical.

It is common to all the above-mentioned teeth cleaning methods that the actual cleaning of the tooth surfaces must be carried out by the user. Regardless of the form chosen for the teeth cleaning, the user has to guide a brush head which only has a size of a few millimeters, over the respective tooth surfaces using various techniques. In this context, a very wide range of indications are applied for performing a practical cleaning motion (in circles, back and forth strokes). Approximately 2.5 to 3 minutes in total are therefore required just for the cleaning activity, in order to carefully clean normal human dentition.

However, manual cleaning by the user has serious deficiencies:

With manual cleaning, there is always the danger that some teeth or tooth surfaces are accidentally skipped.
The user may exert too much or too little pressure with the brush head.
Incorrect technique may result in residual food particles or plaque getting into the spaces between the gingiva and the tooth and causing problems there.
Toothbrush heads are generally not stored with any particular hygiene precautions, and accordingly they may themselves become reservoirs for disease carriers.
Manual tooth cleaning takes 2.5 to 3 minutes twice a day, which is too much time.

In order to mitigate these drawbacks, the tooth cleaning process should be automated and adapted individually to the shape and size of the user's teeth and jaw as far as possible. In particular, a fast, reliable and thorough tooth cleaning technique is desirable, and this is what has led to the development in recent years of tooth cleaning systems for a user's entire dentition.

Patent application DE 102015109891 A1, developed by the inventors of the present application, discloses such a tooth cleaning device for the simultaneous cleaning of several, preferably all teeth of a user. Here, a mouth insert is connected via a coupling to a vibration motor which sets the tooth cleaning device in vibration.

DE 102015109891 A1 also describes a manufacturing process in which first a scan of the denture structure, the transformation of the scanned data into a construction file and the subsequent production is carried out in 3D printing, preferably by means of a laser sintering process. This production technique of the mouth inserts is very complex and also prone to errors. First, the dentition must be scanned with an intraoral scanner, which is a time-consuming and cost-intensive procedure. In the next step, a 3D model of the dentition is generated from the scan data, on the basis of which a construction file for the mouth inserts is created. Finally, the mouth inserts are produced using 3D printing. Any error in the scan is propagated through the entire production process.

The above defects in the state of the art are remedied by the structure of a silicone casing and the construction of a mouthpiece with it according to the present invention, whereby a fully automatic tooth cleaning device individually adapted to the user is obtained. Chemical, kinetic and mechanical cleaning properties shall complement each other in such a way that an almost optimal cleaning and care result is achieved for both teeth and gingiva. The manufacturing process of the present invention should also be suitable for the inexpensive production of large quantities. Manufacturing errors should be eliminated as far as possible by the production process.

SUMMARY OF THE INVENTION

The present invention is provided by the appended claims. The following disclosure of preferred embodiments serves to facilitate the understanding of the present invention.

Accordingly, the present disclosure provides a silicone casing for a mouthpiece of a vibratory tooth cleaning device for the simultaneous cleaning of several, preferably all, teeth of a user. The silicone casing comprises an upper jaw section and a lower jaw section. The upper jaw section and the lower jaw section each correspond to a negative impression of an upper or lower jaw of a human dentition and are each adapted to inner and outer tooth flanks and, in the region of the posterior teeth, additionally to occlusal surfaces of the upper or lower jaw of the user during use of the vibratory tooth cleaning device. The silicone casing has cleaning structures on the upper and lower jaw sections that touch the teeth of the upper or lower jaw on the tooth flanks and occlusal surfaces during operation. The silicone casing respectively comprises an M-shape in a cross-section perpendicular to surfaces of the upper and lower jaw section, which correspond to the tooth flanks, in the area of the upper and lower jaw section, wherein the inner flanks of the M-shape form the upper and lower jaw section respectively and the lower ends of the outer flanks of the M-shape of the lower jaw section are attached to corresponding lower ends of outer flanks of the M-shape of the upper jaw section.

The adaptation to the user's dentition is done by a rough estimation, preferably by a dentist or by means of a bite template, which allows a rough classification in the user's home by the user. The inventor has found that already a relatively small number of about three silicone casing or mouthpiece base sizes (including a holder for the silicone casing) ensures sufficient adaptation for 95% of the adult population. This facilitates the production and adaptation of the silicone casings or mouthpieces.

The cleaning structures of the silicone casing may include, in an embodiment of the disclosure, gum layers applied to the inner surfaces of the silicone casing in the region of the upper jaw and lower jaw sections, cleaning elements formed integrally with the silicone casing and/or strip brushes applied to the upper jaw and lower jaw sections of the silicone casing. Examples and more detailed descriptions of the cleaning structures and their implementation are described in DE 102015109891 A1, FIGS. 4 and [0050]. Thus (with reference to FIG. 4 of DE 102015109891 A1, wherein this figure is included herein by reference) the cleaning structures may be provided in the form of cleaning elements.

In the present disclosure, cleaning elements that are formed in one piece (integrally) with the silicone casing are particularly preferred. The cleaning structures preferably extend essentially perpendicularly from the surface of the upper jaw section and the lower jaw section of the silicone casing. In one embodiment, in the area of the occlusal surfaces and the anterior and posterior tooth surfaces, cylindrical or lamella-shaped cleaning elements or short bristles are provided integrally with the casing. The cleaning structures/bristles in the area of the occlusal surfaces can be shorter and/or thicker than those on the tooth flanks. Thinner cleaning structures/bristles are preferred in the border area between the tooth and the gums to prevent injuries of the gums. A particularly preferred embodiment provides for lamella-shaped cleaning structures, so-called longitudinal lamellae, which are arranged vertically in the area of the tooth flanks, i.e. parallel to the interdental spaces of the user's teeth. The areas of the occlusal surfaces are preferably bristle- or nub-shaped. In addition, the length of the longitudinal lamellae, i.e. their extension from the silicone casing towards the tooth, increases from the incisors to the posterior lateral teeth. The length of the longitudinal lamellae can be longer in the area between the teeth. Preferably the cleaning structures have a length of 0.1 mm to 2 mm and a thickness of 0.5 to 2 mm.

It should be noted that the term "M-shape" in the context of the present disclosure is to be understood as a rough indication of connection points of the silicone surfaces and not as an absolute indication of angles between the surfaces or orientation of the surfaces. For example, the surfaces of the M-shape can be concave/convex curved, wavy or straight. The valley in the middle of the "M shape" can be pointed in a V-shape, as in the casing of the letter V, for example in the area of the incisors and canines. In the area of the posterior teeth, however, trough-shaped cross-sections of the center of the "M-shape" are preferred, which may have rounded corners, semicircular shape, or almost right-angled corners. It is easy for the specialist to adapt the cross-sections according to the tooth shape to the respective position of the upper jaw section and the lower jaw section of the silicone casing. In general, the adjustment should provide a certain amount of play (preferably 0.1 to 1.8 mm) to prevent injury or excessive wear of the silicone surfaces and to leave room for the cleaning work of the cleaning structures.

Figure 4A:
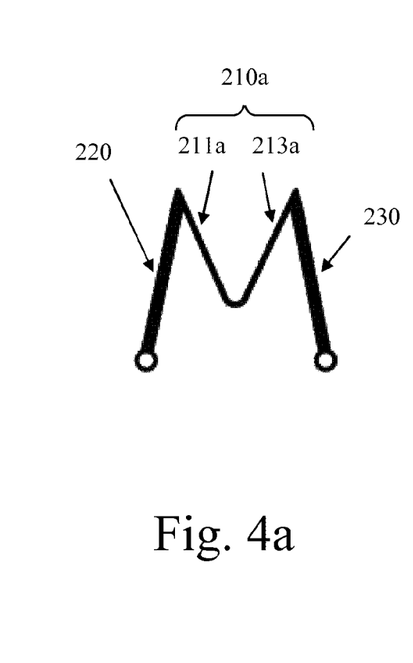
FIGS. 4a-4c are schematic diagrams showing a cross-sectional view showing the sinking in of a user's tooth before the use of a silicone casing.
Figure 4B:
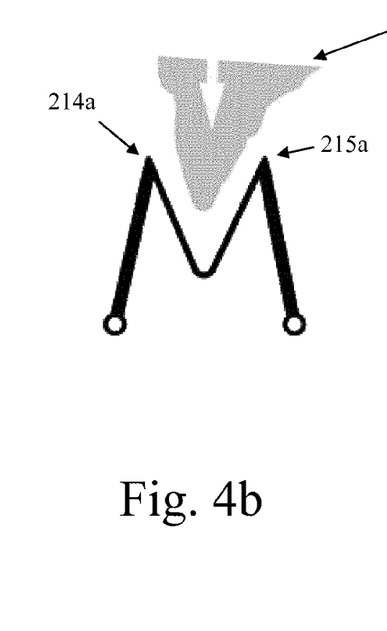
Figure 4C:
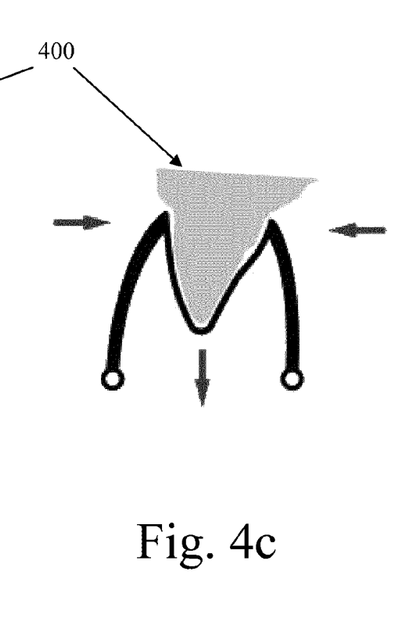

The M-shape of the cross section of the silicone casing of the present embodiment ensures improved adaptation to the user's individual tooth or denture shape. If the user puts a mouthpiece that includes the silicone casing of the embodiment in his or her mouth before use, he or she presses his or her teeth into the upper or lower section of the silicone casing in a kind of biting movement. Due to the M-shape, the lower surface of the upper or lower jaw section has a certain play in the bite direction and follows the bite movement of the user for a certain distance, preferably about 1 to 4 mm. Due to the resulting shortage of material in the area of the proximal ridges of the upper or lower jaw section (i.e. the two upper "tips" of the "M" shape), these ridges are pulled inwards towards the tooth, which improves the contact of the silicone casing with the tooth and thus the cleaning effect of the device. This effect will be explained in more detail later with reference to FIG. 4.

In a preferred embodiment of the mouthpiece of disclosure, a space between the outer and inner flanks of the M-shape of the cross section in the area of the upper and lower jaw section is filled with a material. The material may be a silicone material other than the silicone casing, a silicone foam, a fluid or a gel. The filling can enhance the effect of pressing the ridges of the silicone casing against the user's dentition as described above, since the silicone casing is prevented from collapsing due to the counter-pressure of the filling material.

Optionally, a cavity can be formed between the bottom of the trough formed by the inner flanks in the M-shaped cross-section and a holder of a mouthpiece that includes the silicone casing of the embodiment, to facilitate the sinking of the tooth into the silicone casing. The filling material for this embodiment can be either solid or flexible.

In a preferred embodiment of the mouthpiece of the disclosure, the silicone casing is formed integrally i.e. in one piece. Especially preferred is the production of the silicone casing by vacuum injection moulding. Particularly preferred is the vacuum injection molding also of the cleaning structures in one piece with the silicone casing.

The vacuum injection molding process is a particularly cost-effective method of manufacturing the silicone casing. The holder and its coupling or connecting sections can also be vacuum injection molded. Alternative manufacturing methods include 3D printing or 3D sintering.

In a preferred embodiment of the mouthpiece of the disclosure, the silicone casing comprises a silicone composition that has a Shore A hardness at 23° C. in the range of 20 to 30 Shore A, preferably in the range of 22 to 25 Shore A (DIN ISO 7619-1, see section "Measurement methods"). The silicone composition may also contain additives, dyes, and reinforcing materials (e.g. fibers from harder silicone compositions). In one embodiment, the silicone casing is completely made of such a silicone composition.

The thickness of the inner flanks of the M-shape of the silicone casing can additionally or alternatively be 0.5 to 0.8 times the thickness of the outer flanks of the respective M-shape. In one embodiment, the absolute thickness of the outer flanks can be 1.2 to 2.5 mm, preferably 1.4 to 1.8 mm, and the thickness of the inner flanks can be 1.0 to 2.0 mm, preferably 1.2 to 1.6 mm. However, these wall thicknesses are only to be understood as approximate value and should not be interpreted as limiting the present invention. The wall thicknesses indicated above have been approved in test procedures at vibration frequencies of 100 Hz to 500 Hz. However, other frequencies or stronger motors could allow higher wall thicknesses. On the other hand, smaller wall thicknesses could be achieved with particularly resistant or harder silicone compositions than those specified here.

In a preferred embodiment of the disclosure, a mouthpiece for a vibratory tooth cleaning device for the simultaneous cleaning of several, preferably all, of a user's teeth is provided, comprising a holder and a silicone casing that substantially completely surrounds the holder. The holder preferably extends substantially throughout the entire silicone casing, supports it and serves to transmit vibration. In a particularly preferred embodiment, the silicone casing corresponds to a silicone casing according to the above disclosure.

The silicone casing, which almost completely surrounds the holder, ensures that the mouthpiece has a hygienically perfect surface, adapts well to the user's tooth contours and can be cleaned quickly and easily after use. The combination of the holder, which provides a relatively rigid basic structure, and the silicone casing, the vibrations of a connected vibration motor are transmitted uniformly, even to the area of the rear molars.

In a preferred embodiment of the mouthpiece of the disclosure, the holder includes an upper jaw holder and a lower jaw holder. In this embodiment, the silicone casing can completely surround the upper jaw holder and lower jaw holder, except for a portion of the holder that connects to a vibration motor.

The separate support of the silicone casing by the upper jaw holder and the lower jaw holder can further improve the vibration behavior in the area of the rear molars. In addition, a relative movement of the upper and lower jaws towards each other is enabled, which improves the contact to the user's teeth and gums and can prevent damage to the mouthpiece by biting too hard. The distance between the upper and lower jaw holder also enhances the above-described effect of the M-shape in the cross-section of the silicone casing, since the distance provides additional play for the silicone casing.

Optionally, in these mouthpiece embodiments, the central area of the M-shaped cross-section of the upper and lower jaw section can have a trough shape, with a base of the trough attached to the holder.

In this embodiment, the above-described play of the lower surface of the upper or lower jaw section of the silicone casing is not provided relative to the holder, but exclusively by the relative movement of the upper and lower holders spaced apart from each other (preferably about 2 to 8 mm). This embodiment form increases the stability and thus the cleaning effect of the lower surface of the upper or lower jaw section, i.e. the surfaces intended for cleaning the occlusal surfaces of the posterior teeth, which require and tolerate particularly intensive cleaning due to their surface structure and hardness.

In a preferred embodiment of the mouthpiece of the disclosure, the outer flanks of the M-shaped cross-section are supported on the outer edge of the holder via an additional web of the silicone casing, a notch in the silicone casing and/or a bend in the outer or inner flanks of the M-shape.

This support may be provided punctiform at regular intervals along the outer edge of the holder or over all or part of the circumference of the holder. These additional holder variations support the supporting effect of the outer flanks of the M-shape, since the additional webs are attached to the relatively rigid holder and not to the relatively soft counterpart, i.e. the M-shape of the respectively other jaw section.

In a preferred embodiment of the mouthpiece of the disclosure, the holder is made of homo- or copolyamide, preferably food grade homo- or copolyamide, further preferably PA 6, PA 6.6, PA 4.6, PA 11, PA 12, PA 1010, PA 610, copolyamides or polyamide blends of these and especially preferably PA 11, PA 12, copolyamides or polyamide blends of these.

In a preferred embodiment of the mouthpiece of the disclosure, the upper jaw holder and the lower jaw holder are connected to each other in the area in front of the incisors by a spring section, and the spring section is connected to a coupling section adapted for coupling to a vibration motor.

The spring sections that run between the coupling section and the upper jaw holder and the lower jaw holder improve the transmission of vibrations to the rear area of the upper jaw holder and the lower jaw holder, thus improving the cleaning effect of the mouthpiece in the area of the posterior teeth.

The present disclosure also provides a vibratory tooth cleaning device for the simultaneous cleaning of several, preferably all, of a user's teeth. The vibratory tooth cleaning device comprises a mouthpiece according to one of the embodiments described above and a vibration motor which is detachably connected to the mouthpiece, preferably via a plug connection.

The vibration motor generates a vibration of 100 Hz to 500 Hz, preferably 200 Hz to 350 Hz, which is transmitted to the mouthpiece via the coupling section. In these frequency ranges a good cleaning result is achieved with relatively short duration (about 10 to 30 seconds).

The present disclosure also provides a method for manufacturing a silicone casing for a vibratory tooth cleaning device for the simultaneous cleaning of several, preferably all, of a user's teeth. The method includes providing a negative mold for vacuum injection molding and fabricating a silicone casing by vacuum injection molding using the negative mold. The silicone casing essentially corresponds to one of the embodiments of disclosure described above. In particular, the silicone casing comprises an upper jaw section and a lower jaw section, each of which corresponds to a negative impression of an upper or lower jaw of a human dentition and is adapted to the inner and outer tooth flanks and, in the area of the posterior teeth, to the occlusal surfaces of the user's upper or lower jaw during use of the mouthpiece.

The silicone casing also has cleaning structures in the upper and lower jaw sections that touch the teeth of the upper or lower jaw at the tooth flanks and occlusal surfaces. The vacuum injection molding process is particularly suitable for cost-effective production of the silicone casing with the above properties.

In the method of manufacturing a silicone casing, in one embodiment, the silicone casing may comprise an M-shape in a cross-section perpendicular to surfaces of the upper and lower jaw section, which correspond to the tooth flanks, in the area of the upper and lower jaw section, wherein the inner flanks of the M-shape form the lower jaw section form the dentation section and the lower ends of the outer flanks of the M-shape of the lower jaw section are attached to corresponding lower ends of outer flanks of the M-shape of the upper jaw section.

The present disclosure also provides a method for the manufacture of a mouthpiece for a vibratory tooth cleaning device for the simultaneous cleaning of several, preferably all, of a user's teeth. The method includes a method for manufacturing a silicone casing as described above, providing a holder, and pulling the silicone casing described above over the holder. The design and characteristics of the holder were described above in connection with the mouthpiece of disclosure and are not repeated here. In particular, however, the holder is designed in two parts, with an upper and a lower jaw holders.

The silicone casing has an opening for connecting the holder to a vibration motor, through which the coupling section of the holder protrudes in an assembled state. Due to the flexibility of the silicone casing, this opening can be widened during assembly of the mouthpiece so that the holder fits through without damaging the silicone casing or the holder. The assembly process can also be automated in a production facility or by the user at home, e.g. to replace a defective or worn silicone casing.

DETAILED DESCRIPTION OF THE PREFERRED EMBODIMENTS

In the following, the present disclosure is described by means of figures that schematically show different exemplary embodiments. The embodiments shown in the figures are not necessarily true to scale and some of the dimensions may be chosen to make the principle of the present invention clearer. In the drawing as well as in the description, identical or similar reference signs are used for identical or similar elements and components. All shown and described embodiments can be combined with each other in whole or in part, unless explicitly stated otherwise.

A silicone casing 200 according to the present disclosure includes cleaning structures in the form of bristles or burls with a round, diamond-shaped or other polygonal cross-section on the surfaces that come into contact with the teeth of a user during operation. For the sake of clarity, these are not explicitly shown in the drawings, but should be included in the preferred embodiments of the invention. Graphical examples are shown e.g. in FIG. 4 of DE 102015109891 A1 with corresponding description (same inventor), which are hereby included by reference.

Figure 1:
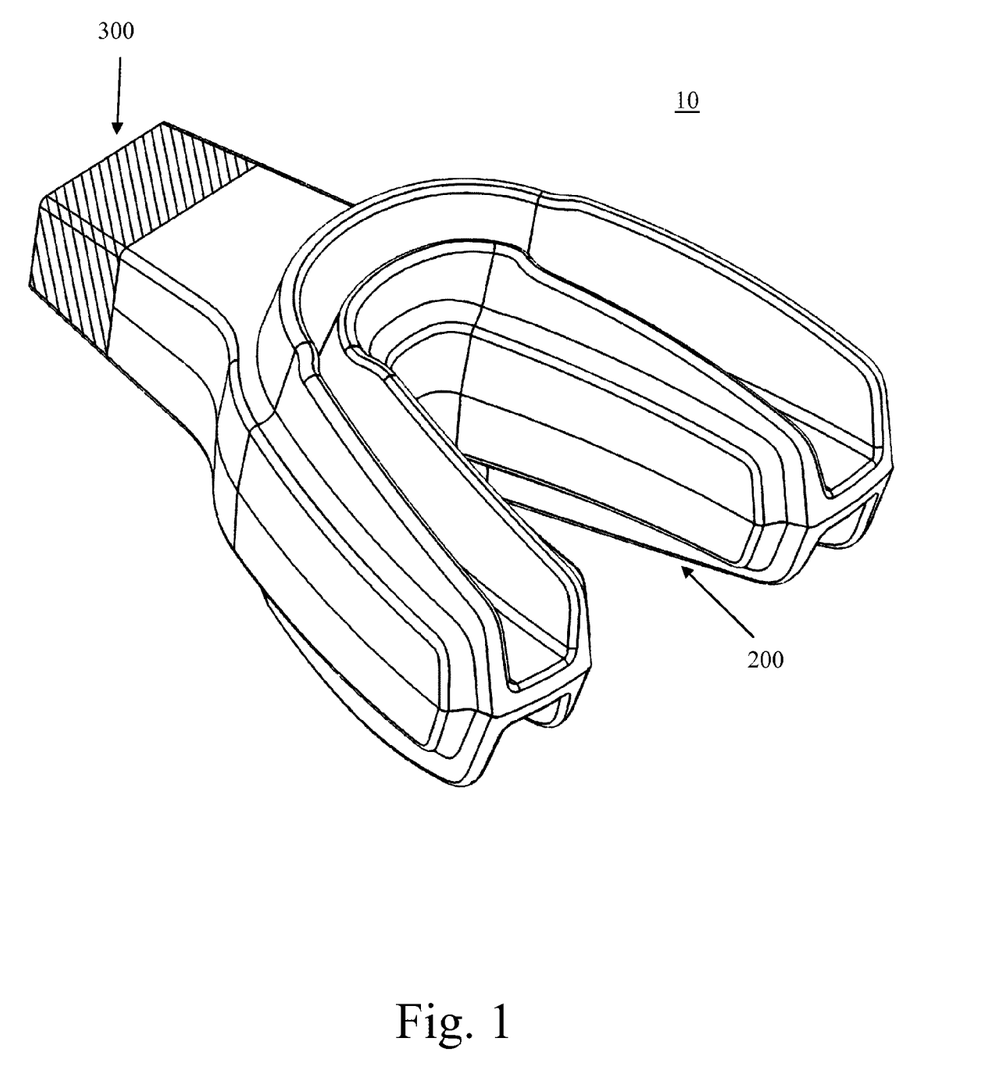
FIG. 1 is a perspective view of a mouthpiece with a silicone casing according to an embodiment of the present disclosure.
Figure 2:
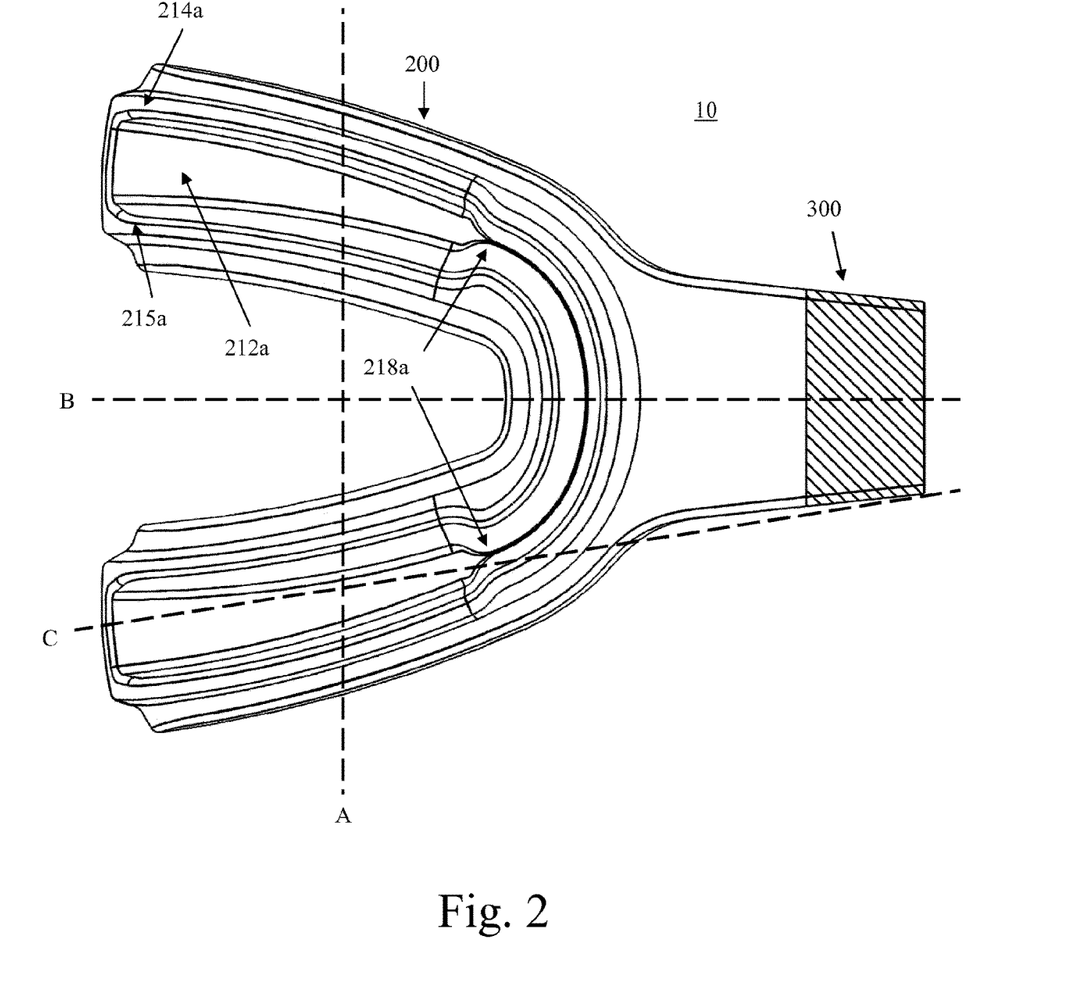
FIG. 2 is a top view of the upper side (of the upper jaw section) of a mouthpiece with a silicone casing according to an embodiment of the present disclosure.
Figure 3:
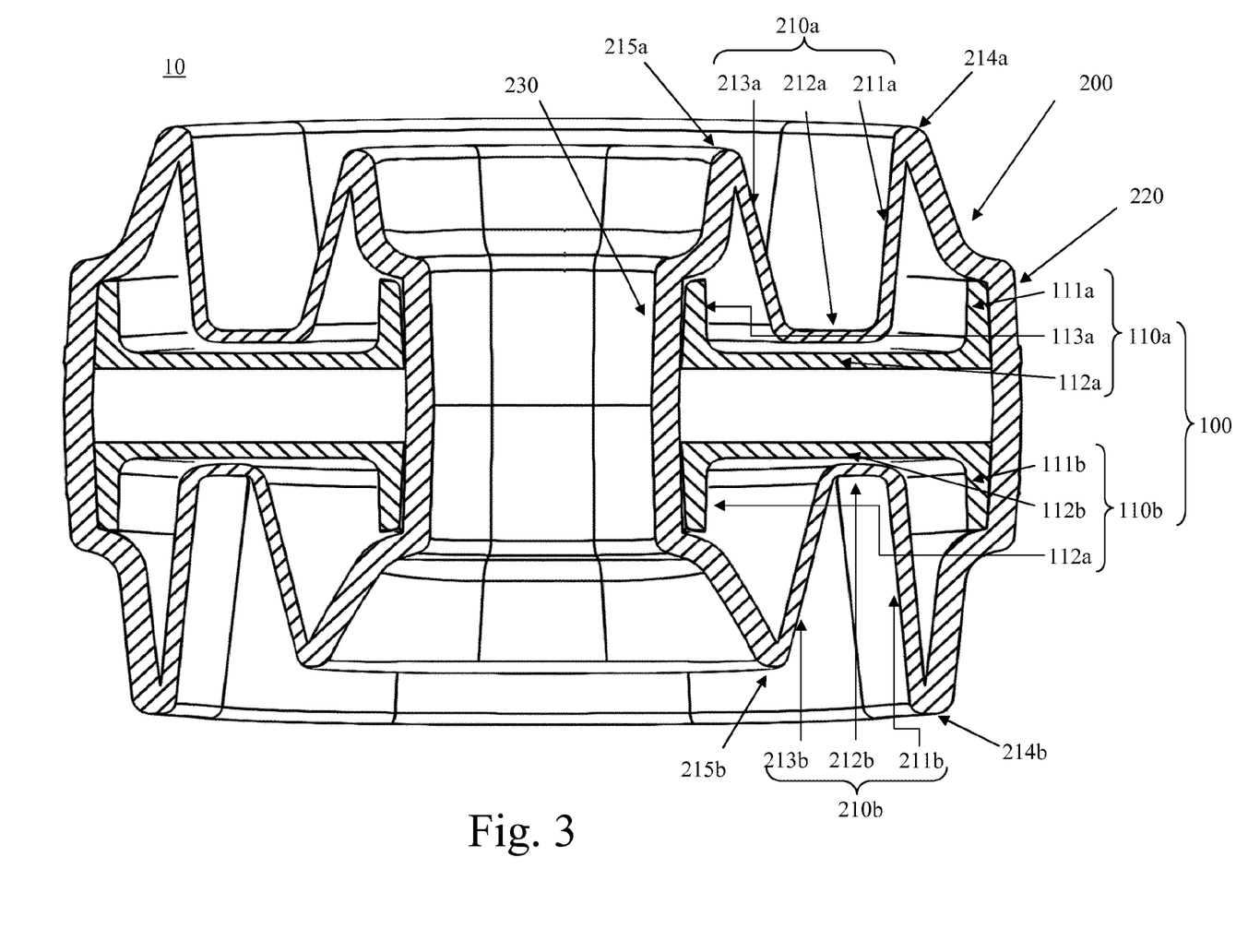
FIG. 3 is a cross-sectional view through a mouthpiece with a silicone casing according to an embodiment of the present disclosure along the section line "A" in FIG. 2.

FIG. 1 is a perspective view of a mouthpiece 10 according to an embodiment of the present disclosure. FIG. 2 is a top view of the upper side (of the upper jaw section) of a mouthpiece 10 according to an embodiment of the present disclosure. A cross-section along the line of intersection A of FIG. 2 is shown in FIG. 3. With reference to FIGS. 1-3, the present disclosure provides a mouthpiece 10 for a vibratory tooth cleaning device for simultaneous cleaning of several, preferably all, of a user's teeth. The mouthpiece 10 of the present disclosure comprises a holder 100 and a silicone casing 200 which is pulled over and almost completely surrounds the holder 100. Only a part of a coupling section 300 of the mouthpiece 10 is exposed from the silicone casing to allow coupling, e.g. by plugging in, with a vibration motor (not shown). In the cross-sectional drawings 3, 6, and 7, the holder 100 is hatched from "top left to bottom right" and the silicone casing 200 from "bottom left to top right".

The silicone casing 200 comprises an upper jaw section 210a and a lower jaw section 210b, each corresponding to a negative impression of an upper or lower jaw of a human dentition and each adapted to inner and outer tooth flanks and, in the region of the posterior teeth, to occlusal surfaces of the upper or lower jaw of the user during use of the mouthpiece 10. Upper jaw section 210a and lower jaw section 210b have an essentially symmetrical structure, except that the upper jaw section 210a has larger dimensions and spacing due to the slightly larger teeth of the upper jaw of the human dentition, as also indicated in the drawings. The following description is simplified according to the symmetry.

Accordingly, upper jaw section 210a and lower jaw section 210b are formed in the region of the posterior teeth approximately by three walls, i.e. the outer wall 211a/211b, the trough bottom 212a/212b and the inner wall 213a/213b of the upper jaw/lower jaw section. In the region of the canines and incisors, upper jaw section 210a and lower jaw section 210b are approximately V-shaped and formed by two walls, i.e. the outer wall 211a/211b and the inner wall 213a/213b of the upper jaw/lower jaw section. The transition between the area of the posterior teeth and the canines or incisors is indicated in FIG. 2 by transition point 218a.

In other words, the cross-section perpendicular to the surfaces 211a-213a and 211b-213b of the upper and lower jaw sections corresponding to the tooth flanks has an M-shape in the area of the upper and lower jaw sections, wherein the center of the M-shape being trough-shaped in the area of the posterior teeth and V-shaped in the area of the canine and incisors. The outer flanks of the M-shape of the upper and lower sections are formed by the corresponding upper/lower part of an outer wall 220 of the silicone casing 200 and the corresponding upper/lower part of an inner wall 230 of the silicone casing 200. The outer wall 211a/211b of the upper jaw/lower jaw section is connected to the outer wall 220 of the silicone casing 200 by an outer ridge 214a/b. Accordingly, the inner wall 213a/213b of the upper jaw/lower jaw section is connected to the inner wall 230 of the silicone casing 200 by an inner ridge 215a/b.

In other words, the combination of the upper/lower part of the outer wall 220 and the inner wall 230 of the silicone casing 200, the inner ridge 215a/b, the outer ridge 214a/b, the outer wall 211a/211b of the upper jaw/lower jaw section, the inner wall 213a/213b of the upper jaw/lower jaw section and, in the area intended for cleaning the user's posterior teeth, additionally the trough bottom 212a/212b with the M-shaped cross section is provided, which allows a special adaptability of the mouthpiece to the user's dentition, as will be described in particular below with reference to FIG. 4a-c.

Figure 5:
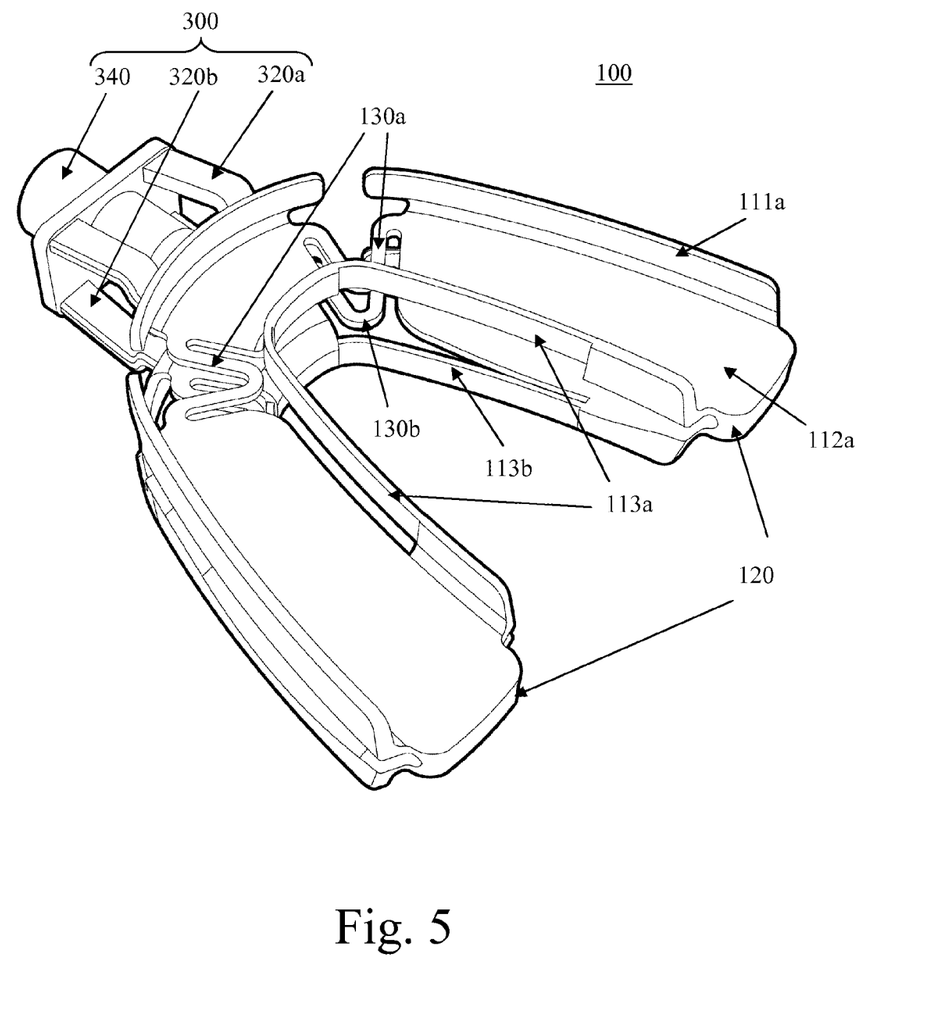
FIG. 5 is a perspective view of a holder of a mouthpiece according to an embodiment of the present disclosure.

The mouthpiece 10 according to the present embodiment also includes a holder 100, which is now described with additional reference to FIG. 5. As shown in FIGS. 3 and 5, the holder 100 of the present embodiment comprises an upper jaw holder 110a and a lower jaw holder 110b. Similar to the upper section 210a and the lower section 210b of the silicone casing 200, the upper holder 110a and lower holder 110b are essentially symmetrical and the following description is simplified accordingly.

The upper/lower holder 110a/110b includes a holder base 112a/112b, which essentially corresponds to the shape of the bite surface of a human dentition. Preferably, as shown in FIGS. 3 and 5, the upper/lower holder 110a/110b comprises an outer wall 111a/111b and an inner wall 113a/113b, each of which extends approximately at right angles from the holder base 112a/112b and can be used to support or attach the silicone casing 200. Outer wall 111a/111b and inner wall 113a/113b run essentially continuously along the inner/outer edge of the holder base 112a/112b, but are separated by a gap in the area of the rearmost posterior teeth to facilitate the pulling of the silicone casing 200 over the holder 100 during assembly. In the present embodiment, the upper jaw holder 110a and the lower jaw holder 110b in the rear end region 120 of the posterior teeth are connected to each other in one piece or by gluing or welding.

Figure 6:
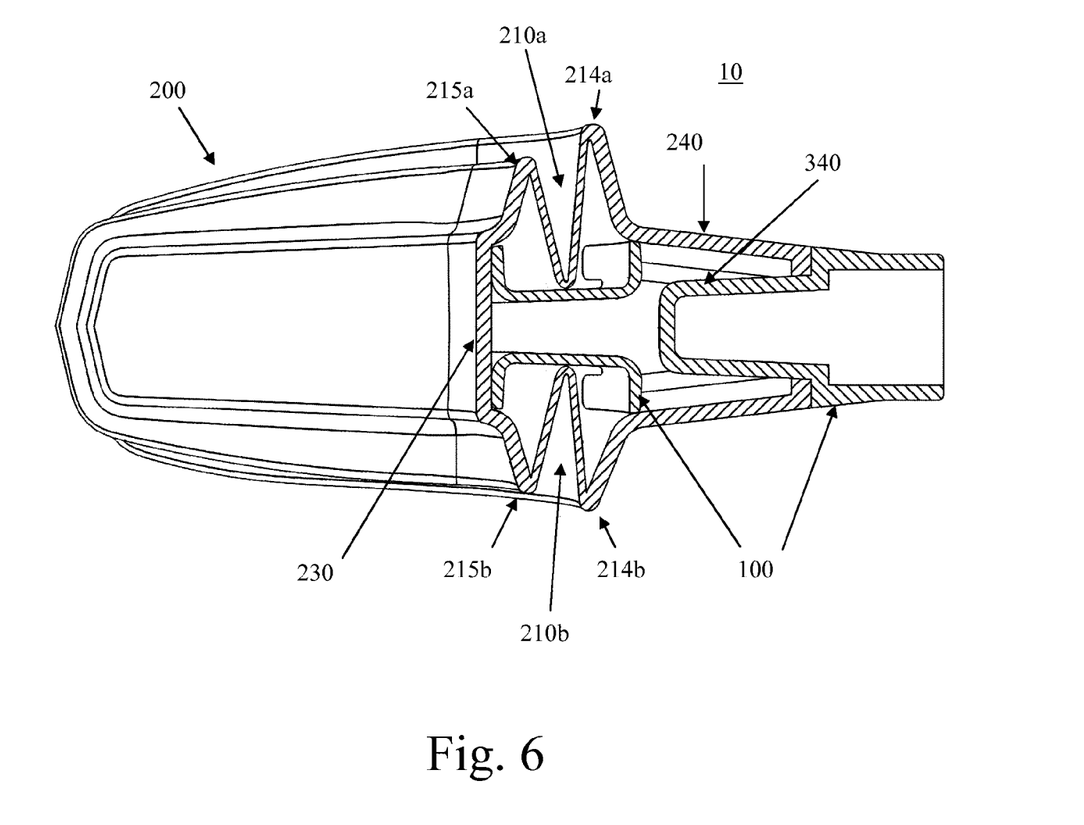
FIG. 6 is a cross-sectional view through a mouthpiece according to an embodiment of the present disclosure along the section line "B" in FIG. 2.
Figure 7:
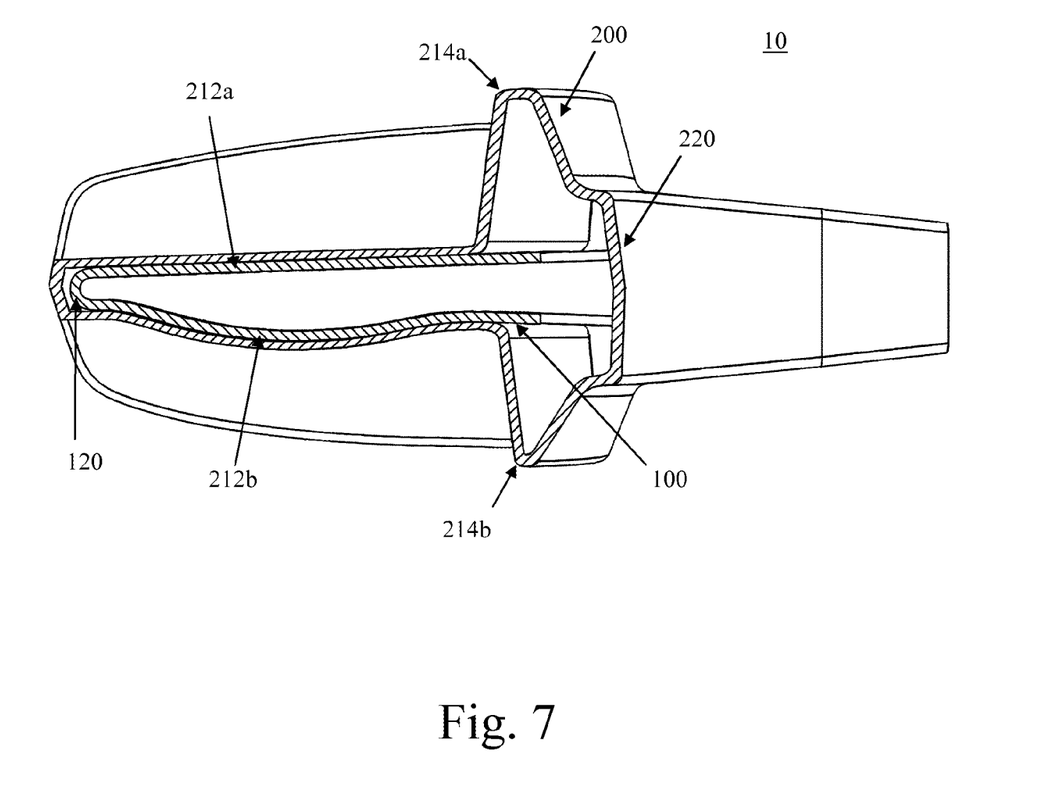
FIG. 7 is a cross-sectional view through a mouthpiece according to an embodiment of the present disclosure along the section line "C" in FIG. 2.

As illustrated in FIGS. 3, 6 and 7, the trough bottom 212a/212b or the lower section of the V-shape in the area of the incisors (FIG. 6) is connected to the holder base 112a/112b. This connection can be made by hook-shaped or mushroom-shaped projections (not shown) of the silicone casing 200, which interact with correspondingly provided holes or elongated openings in the holder, preferably the holder base 112a/112b. Another preferred type of connection is achieved by gluing or welding the silicone casing 200 to the trough bottom 212a/212b (FIGS. 3 and 7) or the lower section of the V-shape (FIG. 6) with the holder base 112a/112b.

FIG. 3 also shows how the inner wall 230 and the outer wall 220 of the silicone casing are each supported via two kinks or bends at the level of the inner walls 113a/113b and the outer walls 111a/111b of the holder 100, respectively. This support reinforces the effect of the M-shaped of the cross section of the silicone casing 200 described in more detail below. In addition, the flexible silicone casing can be put under slight tension by the holder walls 111a/b and 113a/b protruding into the bends, which can prevent slippage or a wear point between holder 100 and silicone casing 200. Alternatively or in addition to the bends of the inner wall 230 and the outer wall 220 of the silicone casing shown, the supporting effect can also be achieved or supported by notches (not shown) in the silicone casing 200 and/or additional webs (not shown) extending from the inner wall 230 or the outer wall 220 to the holder 100.

Approximately in the area of the canines, the upper/lower jaw holder 110a/110b of the holder 100 of the present embodiment can optionally have a swivel spring section 130a/130b. It is formed, as shown, by recesses in the holder base 112a/112b and outer wall 111a/111b (optionally but not shown also in the inner wall 113a/113b) of the upper/lower jaw holder 110a/110b, so that the upper/lower jaw holder 110a/110b is divided by meandering and tapered sections in the plane of the holder base 112a/112b. The swivel spring section 130a/130b allows a certain play of the holder 110 in the bite plane of the user, so that the adaptability to the specific dentition of the user is enabled without disturbing the transmission of vibrations to the rear area (posterior teeth).

The upper/lower jaw holders 110a/110b are connected to each other in the area in front of the incisors via upper and lower spring sections 320a, 320b, and the spring sections 320a, 320b are further connected to a coupling section 340, which is adapted for coupling to a vibration motor (not shown). Coupling section 340 and the spring sections 320a, 320b together form the connecting section 300. The connection to the vibration motor is preferably via a plug connection. However, alternative connection techniques are also conceivable (e.g. screw connection) and the invention should not be limited to these.

FIG. 4a-c schematically show how the M-shaped cross-section of the silicone holder 200 promotes contact between the silicone casing and the user's teeth during use, using an upper jaw section 210a as an example. The schematic cross sections shown in FIG. 4a-c are approximate cross sections along line "B" in FIG. 2. Other elements of mouthpiece 10 have been omitted for clarity. As shown in FIG. 4a, the M-shape of the cross-section of the upper jaw section 210a is formed by upper parts of the inner wall 230 and the outer wall 220 of the silicone casing, the outer wall 211a, and the inner wall 213a of the upper jaw section 210a. The points at the lower ends of the upper parts of the inner wall 230 and the outer wall 220 in FIG. 4a-c indicate that they are supported by connection to the holder (not shown) or a corresponding counter-movement on the lower jaw section (not shown).

As shown in FIGS. 4b and c, the M-shape of the cross-section of the silicone casing of the present embodiment achieves improved adaptation to the individual tooth or denture shape of the user. If the user places the mouthpiece in the mouth prior to use, he or she presses his or her teeth 400 into the upper or lower section of the silicone casing in a kind of biting movement, as shown in FIG. 4b. Due to the M-shape, the lower surface of the upper or lower jaw section has a certain amount of play and, as indicated by the vertical arrow in FIG. 4c, follows the bite movement of the user a certain distance, preferably about 1 to 4 mm. Due to the resulting lack of material in the area of the proximal ridges 214a and 215a of the upper jaw and lower jaw sections, these ridges 214a, 215a are pulled inwards towards the tooth as indicated by the horizontal arrows in FIG. 4c. This pressing of the ridges 214a, 215a in response to the bite movement of the user greatly improves the contact of the silicone casing with the user's tooth 400 and thus the cleaning efficiency of a vibratory tooth cleaning device using a mouthpiece according to the present invention can be significantly increased.

FIG. 6 is a cross-sectional view through a mouthpiece according to an embodiment of the present disclosure along the section line "B" in FIG. 2. FIG. 6 shows in particular the M-shape in cross-section in the area of the incisors. As shown, the upper jaw/lower jaw section 210a/210b of the silicone casing 200 is formed by the corresponding upper/lower part of an outer wall 220 of the silicone casing 200, the corresponding upper/lower part of an inner wall 230 of the silicone casing 200, the outer wall, and the inner wall of the upper jaw/lower jaw section 210a/210b.

The spring sections of the holder 100 (not shown in FIG. 6) are covered by a silicone casing coupling section 240, which is preferably flush with and attached to the coupling section 340 of the holder 100, preferably by gluing or welding, or by hook-shaped or mushroom-shaped projections (not shown) of the silicone casing coupling section 240 that cooperate with correspondingly provided holes or elongated openings in the coupling section 340 of the holder 100 (not shown).

FIG. 7 is a cross-sectional view through a mouthpiece according to an embodiment of the present disclosure along the section line "C" in FIG. 2. FIG. 7 shows the flush adhesive connection between holder 100 in the area of the holder base 112a/112b and the silicone casing 200. In addition, the connection 120 between upper jaw holder 110a and lower jaw holder 110b is shown.

Measurement Procedure

The Shore A hardness specified in this description is measured according to DIN ISO 7619-1 at 23° C. (±2° C.). In a measuring procedure according to DIN ISO 7619-1, a steel pin with a defined weight of 1 Kg±0.1 Kg is pressed onto a 6 mm high sample (previously stored for 1 h at measuring temperature) and the penetration depth of the pin is measured after 15 s. The steel pin has a stub tip, the end face of the truncated cone has a diameter of 0.79 millimeters, the opening angle is 35°. A scale was introduced to determine the SHORE-A hardness values, ranging from 0 Shore (2.5 mm penetration depth) to 100 SHORE (0 mm penetration depth). The measurement is repeated five times and then averaged.

REFERENCE SIGNS LIST

10 Mouthpiece
  100 holder
    110a Upper jaw holder
    110b Lower jaw holder
    111a/b Outer wall of the upper/lower holder
    112a/b Upper/lower holder base
    113a/b Inner wall of the upper/lower holder
    120 Connection between upper and lower jaw holder
    130a/b Swivel spring section of the upper/lower jaw holder
  200 silicone casing
    210a Upper jaw section
    210b Lower jaw section
    211a/b Outer wall of the upper/lower jaw section
    212a/b Trough bottom of the upper/lower jaw section
    213a/b Inner wall of the upper/lower jaw section
    214a/b Outer ridge of the upper/lower jaw section
    215a/b Inner ridge of the upper/lower jaw section
    218a Transition from lateral teeth to incisors, upper jaw section
    220 Outer wall of the silicone casing
    230 Inner wall of the silicone casing
    240 Silicone casing coupling section
  300 Coupling section
    320a/b upper/lower spring sections of the coupling section
    340 Coupling insertion section
  400 Tooth of a user
  A Cutting line FIG. 3
  B Cutting line FIG. 6
  C Cutting line FIG. 7

What is claimed is:

1. A silicone casing (200) for a mouthpiece of a vibratory tooth cleaning device,
comprising:
an upper jaw section (210a);
and a lower jaw section (210b), wherein
the upper jaw section (210a) and the lower jaw section (210b) each correspond to a negative impression of an upper or lower jaw of a human dentition and are each adapted to inner and outer tooth flanks and, in a region of a posterior teeth, additionally to occlusal surfaces of the upper or lower jaw of the user during use of the vibratory tooth cleaning device, wherein
the silicone casing (200) on the upper and lower jaw sections (210a, 210b) has cleaning structures adapted to contact the teeth of the upper or lower jaw at the tooth flanks and occlusal surfaces during operation, and wherein
the silicone casing (200) is formed in one piece and, in a cross-section perpendicular to surfaces (211a, 211b, 213a, 213b) of the upper and lower jaw sections (210a, 210b) corresponding to the tooth flanks, in the region of the upper and lower jaw sections (210a, 210b) each comprises an M-shape, wherein a center of the M-shape is trough-shaped in the region of the posterior teeth and V-shaped in regions of canines and incisors, inner flanks (211a, 211b, 212a, 212b, 213a, 213b) of the M-shape form the upper and lower jaw sections (210a, 210b), respectively, a transition point (218a) is formed in each of the upper and lower jaw sections as a transition between the trough-shape in the region of the posterior teeth and the V-shape in the regions of the canines and incisors, so that in appearance, the V-shape expands to be trough-shaped at the transition point (218a), such that opposite inner flanks of the M-shape diverge away from each other in a V-shaped manner, lower ends of the outer flanks of the M-shape (220, 230) of the lower jaw section (210b) are connected to corresponding lower ends of outer flanks (220, 230) of the M-shape of the upper jaw section (210a), the inner flanks (211a, 211b, 212a, 212b, 213a, 213b) and the outer flanks (220, 230) are correspondingly connected by ridges (215a, 215b, 214a, 214b), and the ridges (215a, 215b, 214a, 214b) are configured to be pulled inwards towards the teeth to contact the teeth in response to a bite movement of the user, wherein a thickness of the inner flanks (211a, 211b, 212a, 212b, 213a, 213b) of the M-shape is 0.5 to 0.8 times a thickness of the outer flanks (220, 230) of the respective M-shape, and wherein the thickness of the outer flanks (220, 230) is 1.2 to 2.5 mm and the thickness of the inner flanks (211a, 211b, 212a, 212b, 213a, 213b) is 1.0 to 2.0 mm.

2. The silicone casing (200) according to claim 1, wherein the silicone casing (200) is manufactured by vacuum injection molding.

3. The silicone casing (200) according to claim 1, wherein the silicone casing (200) comprises or consists of a silicone composition having a Shore A hardness at 23° C. in the range of 20 to 30 Shore A.

4. The silicone casing (200) according to claim 1, wherein the thickness of the outer flanks (220, 230) is 1.4 to 1.8 mm, and the thickness of the inner flanks (211a, 211b, 212a, 212b, 213a, 213b) is 1.2 to 1.6 mm.

5. The silicone casing (200) according to claim 1, wherein a space between the outer flanks (220, 230) and inner flanks (211a, 211b, 213a, 213b) of the M-shape of the cross section in the region of the upper and lower jaw sections (210a, 210b) is filled with a material.

6. A mouthpiece (10) for a vibratory tooth cleaning device, comprising:
   a holder (100); and
   a silicone casing which substantially completely surrounds the holder (100) and the holder (100) extends substantially through the entire silicone casing, wherein the silicone casing is a silicone casing (200) according to claim 1.

7. The mouthpiece (10) according to claim 6, wherein the holder (100) comprises an upper jaw holder (110a) and a lower jaw holder (110b), and the silicone casing completely surrounds the upper jaw holder (110a) and the lower jaw holder (110b) except for a connecting portion of the holder (100) adapted to be coupled with an external device.

8. The mouthpiece (10) according to claim 6, wherein the central portion (212a, 212b) of the M-shaped cross section of the upper and lower jaw sections (210a, 210b) has a trough shape, and wherein a trough bottom (212a, 212b) is attached to the holder (100).

9. The mouthpiece (10) according to claim 6, wherein the outer flanks (220, 230) of the M-shape are supported on the holder (100) via an additional web, notch or bend in the outer flanks (220, 230).

10. The mouthpiece (10) according to claim 7, wherein the holder (100) is made of food grade material that is a homo-polymide, copolyamide, or polyamide mixture of:
   PA 6, PA 6.6, PA 4.6, PA 11, PA 12, PA 1010, or PA 610.

11. The mouthpiece (10) according to claim 7, wherein the upper jaw holder (110a) and the lower jaw holder (110b) are connected to each other in the region in front of the incisors via a spring section (320a, 320b) and the spring section (320a, 320b) is connected to a coupling section (340) provided with holes or elongated openings and adapted for coupling to an external device.

12. A vibratory tooth cleaning device for simultaneously cleaning all of a user's teeth, comprising:
   a mouthpiece (10) according to claim 6;
   wherein the mouthpiece (10) is adapted to be detachably connected to an external device.

13. A method of manufacturing a silicone casing (200) according to claim 1, comprising:
   providing a vacuum injection molding process, and
   manufacturing a silicone casing (200) in one piece by the vacuum injection molding process.

14. A method of manufacturing a mouthpiece (10) for a vibratory tooth cleaning device, comprising:
   a method according to claim 13,
   providing a holder (100); and
   pulling the silicone casing (200) obtained by the method according to claim 13 over the holder (100).

\* \* \* \* \*